US012666280B2

(12) United States Patent (10) Patent No.: US 12,666,280 B2
Zhu (45) Date of Patent: Jun. 23, 2026

(54) NEIGHBOR CELL CONFIGURATION METHOD AND APPARATUS THEREFOR

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 304 days.

(21) Appl. No.: 18/564,016

(22) PCT Filed: May 28, 2021

(86) PCT No.: PCT/CN2021/096913
§ 371 (c)(1),
(2) Date: Nov. 24, 2023

(87) PCT Pub. No.: WO2022/246829
PCT Pub. Date: Dec. 1, 2022

(65) Prior Publication Data
US 2024/0267757 A1 Aug. 8, 2024

(51) Int. Cl.
*H04W 24/02* (2009.01)
*H04W 36/08* (2009.01)
*H04W 68/02* (2009.01)
*H04W 72/0446* (2023.01)
*H04W 76/20* (2018.01)

(52) U.S. Cl.
CPC .......... *H04W 24/02* (2013.01); *H04W 36/08* (2013.01); *H04W 68/02* (2013.01); *H04W 72/0446* (2013.01); *H04W 76/20* (2018.02)

(58) Field of Classification Search
CPC ..... H04W 24/02; H04W 36/08; H04W 68/02; H04W 72/0446; H04W 76/20; H04W 36/0088; H04W 36/0083; H04W 36/00835; H04W 36/083; H04W 48/20; H04W 48/12; H04W 84/06; Y02D 30/70
See application file for complete search history.

(56) References Cited

U.S. PATENT DOCUMENTS

| | | | | | |
|---|---|---|---|---|---|
| 8,705,453 | B2 * | 4/2014 | Jung | ..................... | H04W 48/10 |
| | | | | | 455/67.11 |
| 9,794,756 | B2 * | 10/2017 | Song | ..................... | H04W 4/50 |

(Continued)

FOREIGN PATENT DOCUMENTS

| | | | |
|---|---|---|---|
| CN | 111866928 A | 10/2020 |
| CN | 112020108 A | 12/2020 |

(Continued)

OTHER PUBLICATIONS

PCT/CN2021/096913, International Search Report dated Feb. 16, 2022, 2 pages.

(Continued)

*Primary Examiner* — Afshawn M Towfighi
(74) *Attorney, Agent, or Firm* — Cozen O'Connor

(57) ABSTRACT

A method for configuring a neighbor cell includes: sending first system information to a terminal device within a specified area, the first system information including: a list of neighboring cells corresponding to a cell where the terminal device is located for at least one time period, and a cell configuration parameter of each neighboring cell in the list of neighboring cells.

15 Claims, 4 Drawing Sheets

(56)  References Cited

U.S. PATENT DOCUMENTS

| | | | | |
|---|---|---|---|---|
| 11,553,365 | B2 * | 1/2023 | Kim | H04W 24/10 |
| 2012/0196593 | A1 * | 8/2012 | Jung | H04W 48/10 |
| | | | | 455/434 |
| 2013/0244669 | A1 * | 9/2013 | Das | H04W 24/02 |
| | | | | 455/446 |
| 2014/0162658 | A1 * | 6/2014 | Jung | H04W 36/0094 |
| | | | | 455/437 |
| 2015/0201356 | A1 * | 7/2015 | Wang | H04W 52/0216 |
| | | | | 370/331 |
| 2019/0289532 | A1 * | 9/2019 | Yi | H04L 1/1614 |

FOREIGN PATENT DOCUMENTS

| | | | | | |
|---|---|---|---|---|---|
| CN | 112042243 | A | | 12/2020 | |
| CN | 112399498 | A | | 2/2021 | |
| EP | 2070377 | | * | 5/2014 | |
| EP | 3624483 | A1 | * | 3/2020 | H04W 24/02 |
| WO | WO 2021062599 | A1 | | 4/2021 | |

OTHER PUBLICATIONS

Chinese Patent Application No. 2021800015683 First Office Action dated Sep. 30, 2024, 5 pages.
Chinese Patent Application No. 2021800015683 English translation of First Office Action dated Sep. 30, 2024, 7 pages.
Chinese Patent Application No. 2021800015683 Office Action dated Feb. 20, 2025 with English translation, 17 pages.

* cited by examiner

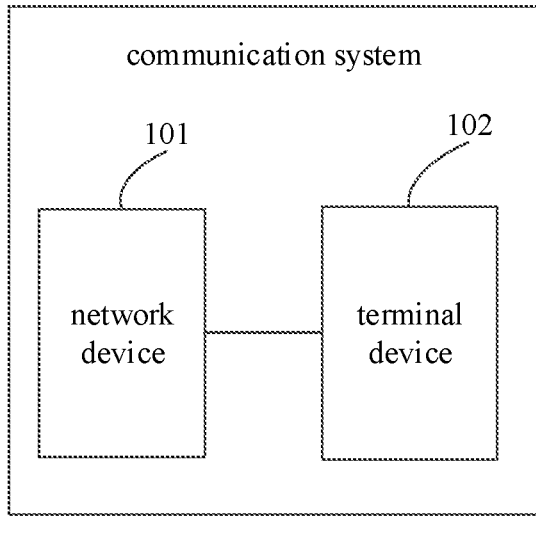

FIG. 1

| sending first system information to a terminal device within a specified area, in which the first system information includes: a list of neighboring cells corresponding to a cell where the terminal device is located for at least one time period, and a cell configuration parameter of each neighboring cell in the list of neighboring cells | — 201 |

FIG. 2

| sending second system information to the terminal device within the specified area, in which the second system information includes a paging time domain resource corresponding to the at least one time period | — 301 |

| sending first system information to a terminal device within a specified area, in which the first system information includes: a list of neighboring cells corresponding to a cell where the terminal device is located for at least one time period, and a cell configuration parameter of each neighboring cell in the list of neighboring cells | — 302 |

FIG. 3

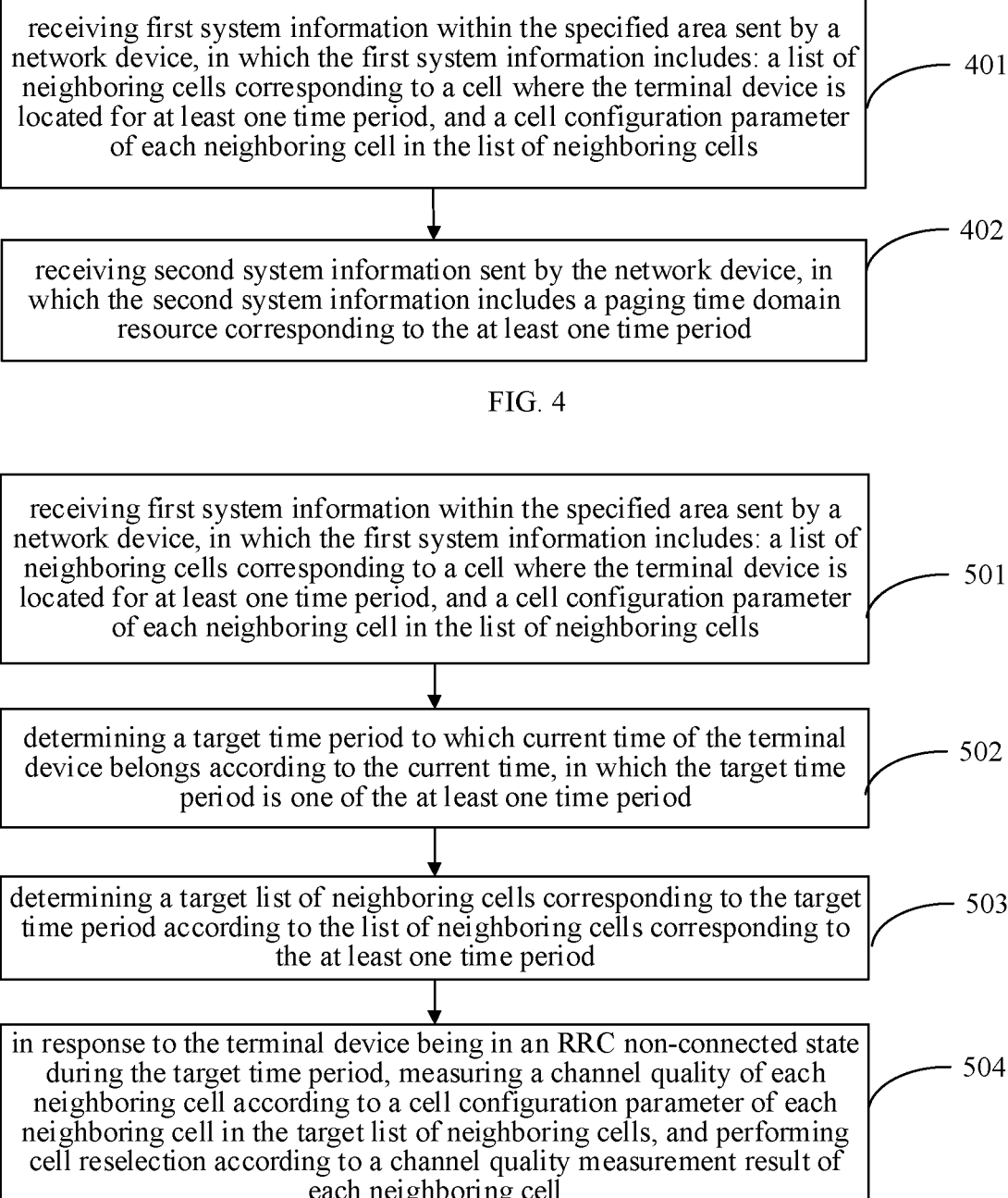

receiving first system information within the specified area sent by a network device, in which the first system information includes: a list of neighboring cells corresponding to a cell where the terminal device is located for at least one time period, and a cell configuration parameter of each neighboring cell in the list of neighboring cells — 401 receiving second system information sent by the network device, in which the second system information includes a paging time domain resource corresponding to the at least one time period — 402

FIG. 4 receiving first system information within the specified area sent by a network device, in which the first system information includes: a list of neighboring cells corresponding to a cell where the terminal device is located for at least one time period, and a cell configuration parameter of each neighboring cell in the list of neighboring cells — 501 determining a target time period to which current time of the terminal device belongs according to the current time, in which the target time period is one of the at least one time period — 502 determining a target list of neighboring cells corresponding to the target time period according to the list of neighboring cells corresponding to the at least one time period — 503 in response to the terminal device being in an RRC non-connected state during the target time period, measuring a channel quality of each neighboring cell according to a cell configuration parameter of each neighboring cell in the target list of neighboring cells, and performing cell reselection according to a channel quality measurement result of each neighboring cell — 504

FIG. 5

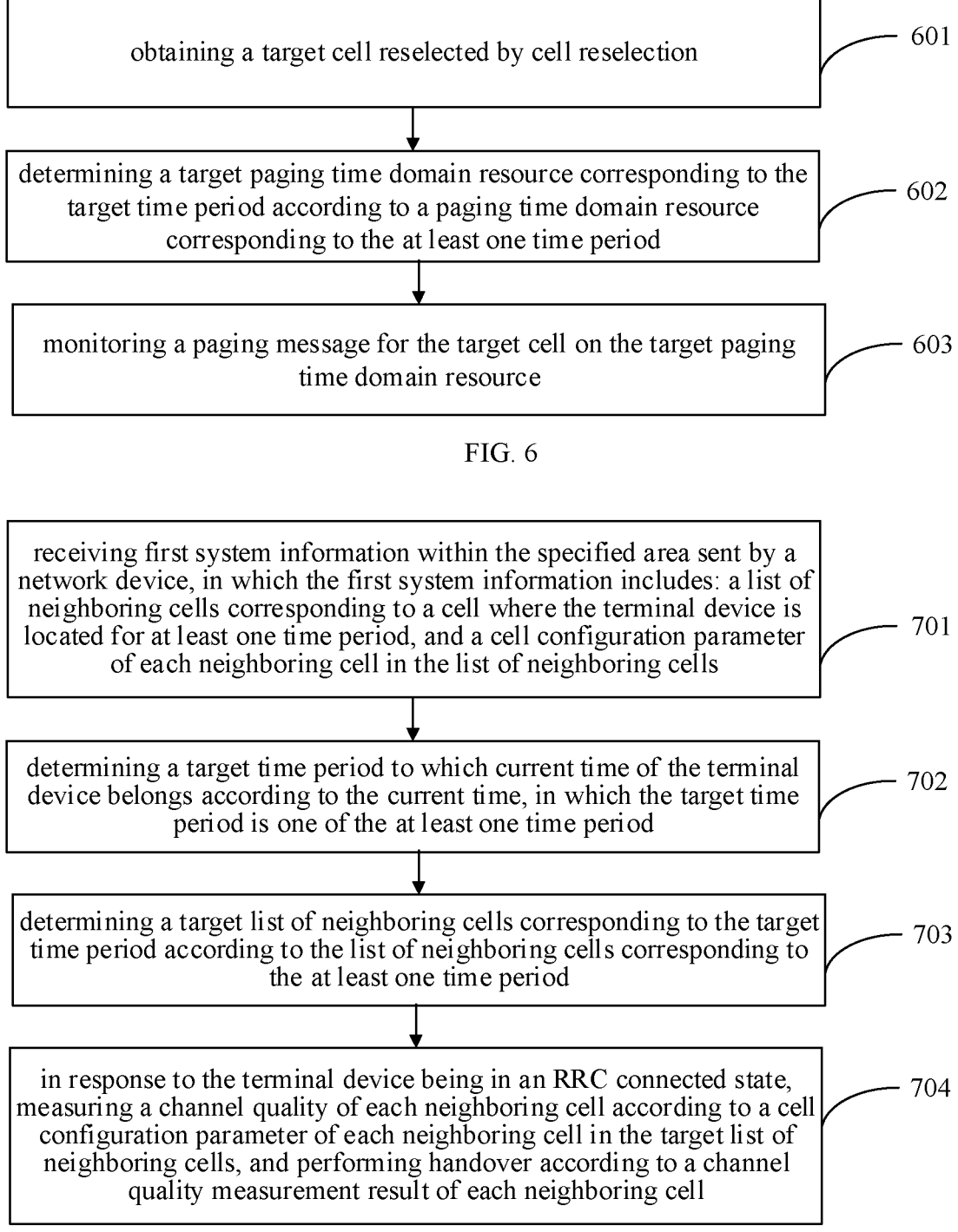

obtaining a target cell reselected by cell reselection — 601 determining a target paging time domain resource corresponding to the target time period according to a paging time domain resource corresponding to the at least one time period — 602 monitoring a paging message for the target cell on the target paging time domain resource — 603

FIG. 6 receiving first system information within the specified area sent by a network device, in which the first system information includes: a list of neighboring cells corresponding to a cell where the terminal device is located for at least one time period, and a cell configuration parameter of each neighboring cell in the list of neighboring cells — 701 determining a target time period to which current time of the terminal device belongs according to the current time, in which the target time period is one of the at least one time period — 702 determining a target list of neighboring cells corresponding to the target time period according to the list of neighboring cells corresponding to the at least one time period — 703 in response to the terminal device being in an RRC connected state, measuring a channel quality of each neighboring cell according to a cell configuration parameter of each neighboring cell in the target list of neighboring cells, and performing handover according to a channel quality measurement result of each neighboring cell — 704

FIG. 7

NEIGHBOR CELL CONFIGURATION METHOD AND APPARATUS THEREFOR

CROSS REFERENCE TO RELATED APPLICATIONS

This application a U.S. national phase of International Application No. PCT/CN2021/096913, filed on May 28, 2021, the entire contents of which are incorporated herein by reference.

TECHNICAL FIELD

The disclosure relates to a field of communication technologies, in particular to a method for configuring a neighboring cell and an apparatus for configuring a neighboring cell.

BACKGROUND

In wireless communication technologies, for instance, in non-terrestrial network communication, if a neighboring cell is determined based on a terminal device in terrestrial network, or in other words, neighboring cell information corresponding to the terminal device is determined based on the geographic location of the terminal device, it is likely to cause the terminal device to measure neighboring cells that do not exist, which results in unnecessary power consumption by the terminal device.

SUMMARY

According to a first aspect of embodiments of the disclosure, a method for configuring a neighboring cell, performed by a network device, is provided. The method includes:

sending first system information to a terminal device within a specified area, in which the first system information includes: a list of neighboring cells corresponding to a cell where the terminal device is located for at least one time period, and a cell configuration parameter of each neighboring cell in the list of neighboring cells.

According to a second aspect of embodiments of the disclosure, a method for configuring a neighboring cell, performed by a terminal device within a specified area, is provided. The method includes: receiving first system information within the specified area sent by a network device, in which the first system information includes: a list of neighboring cells corresponding to a cell where the terminal device is located for at least one time period, and a cell configuration parameter of each neighboring cell in the list of neighboring cells.

According to a third aspect of embodiments of the disclosure, a device for configuring a neighboring cell is provided. The device includes: a processor and a memory having computer programs stored thereon. When the computer programs are executed by the processor, the method described in the first aspect above is implemented.

According to a fourth aspect of embodiments of the disclosure, a device for configuring a neighboring cell is provided. The device includes: a processor and a memory having computer programs stored thereon. When the computer programs are executed by the processor, the method described in the second aspect above is implemented.

BRIEF DESCRIPTION OF THE DRAWINGS

In order to clearly illustrate technical solutions in embodiments of the disclosure or in background technologies, a description of drawings to be used in the embodiments or the background technologies is given below.

FIG. 1 is a structural diagram of a communication system provided by an embodiment of the disclosure.

FIG. 2 is a flowchart of a method for configuring a neighboring cell provided by an embodiment of the disclosure.

FIG. 3 is a flowchart of a method for configuring a neighboring cell provided by an embodiment of the disclosure.

FIG. 4 is a flowchart of a method for configuring a neighboring cell provided by an embodiment of the disclosure.

FIG. 5 is a flowchart of a method for configuring a neighboring cell provided by an embodiment of the disclosure.

FIG. 6 is a flowchart of a method for configuring a neighboring cell provided by an embodiment of the disclosure.

FIG. 7 is a flowchart of a method for configuring a neighboring cell provided by an embodiment of the disclosure.

DETAILED DESCRIPTION

Figure 8:
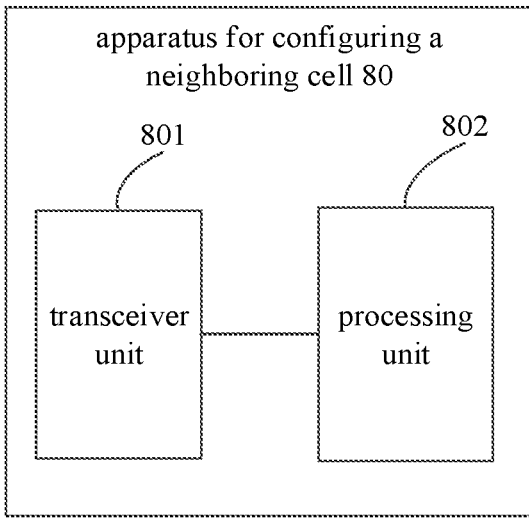
FIG. 8 is a block diagram of an apparatus for configuring a neighboring cell provided by an embodiment of the disclosure.

In order to better understand a method for configuring a neighboring cell provided in embodiments of the disclosure, a communication system used in the embodiments of the disclosure is first described below.

As illustrated in FIG. 1, FIG. 1 is a structural diagram of a communication system provided by an embodiment of the disclosure. The communication system may include, but is not limited to, a network device and a terminal device. The number and form of devices shown in FIG. 1 are only for examples and do not constitute a limitation on the embodiments of the disclosure, and two or more network devices and two or more terminal devices may be included in practical application. The communication system shown in FIG. 1 includes, for example, a network device 101 and a terminal device 102.

The network device 101 in the embodiments of the disclosure is an entity on a network side for transmitting or receiving signals. For example, the network device 101 may be a satellite device in a satellite communication system.

The terminal device 102 in the embodiments of the disclosure is an entity on a user side for receiving or transmitting signals, such as a cellular phone. The terminal device may also be referred to as a terminal, user equipment (UE), a mobile station (MS), a mobile terminal (MT), and the like. The terminal device can be a car with a communication function, a smart car, a mobile phone, a wearable devices, a Pad, a computer with a wireless transceiver function, a virtual reality (VR) terminal device, an augmented reality (AR) terminal device, a wireless terminal device in industrial control, a wireless terminal device in self-driving, a wireless terminal device in remote medical surgery, a wireless terminal device in smart grid, a wireless terminal device in transportation safety, a wireless terminal device in smart city, a wireless terminal device in smart home, etc. The specific technology and specific device form adopted by the terminal device are not limited in the embodiments of the disclosure.

In the above-described communication system, when the terminal device accesses to the network device, the terminal device communicates with the network device via a non-terrestrial network. The terminal device determines corresponding neighboring cell information based on its own geographic location information, and performs cell measurement based on the neighboring cell information in a process of moving. However, in a communication system of the non-terrestrial network, a cell coverage range of the above network device changes with time. That is, the cell coverage range of the above network device is not fixed. Thus, if the neighboring cell information of the terminal device is determined based on the ground geographic location, the terminal device may search for a cell that is not within the cell coverage range of the network device during a current time period, which results in unnecessary power consumption of the terminal device.

In the embodiments of the disclosure, the neighboring cell information of the terminal device during a corresponding time period is sent to the terminal device, so that the terminal device can perform measurement based on the neighboring cell information during the corresponding time period. Therefore, the terminal device can be prevented from measuring neighboring cells that do not currently exist, and the resource overhead of the terminal device can be saved.

It is understandable that the communication system described in the embodiments of the disclosure is intended to clearly illustrate the technical solutions according to the embodiments of the disclosure, and does not constitute a limitation on the technical solutions provided in the embodiments of the disclosure. Those skilled in the art may understand that as system architectures evolve and new business scenarios emerge, the technical solutions provided in the embodiments of the disclosure are also applicable to similar technical problems.

A method for configuring a neighboring cell and an apparatus for configuring a neighboring cell will be introduced in detail below with reference to the accompanying drawings.

As illustrated in FIG. 2, FIG. 2 is a flowchart of a method for configuring a neighboring cell provided by an embodiment of the disclosure. The method is performed by a network device in the communication system shown in FIG. 1. As illustrated in FIG. 2, the method may include, but is not limited to, the following steps.

At step S201, first system information is sent to a terminal device within a specified area, in which the first system information includes: a list of neighboring cells corresponding to a cell where the terminal device is located for at least one time period, and a cell configuration parameter of each neighboring cell in the list of neighboring cells.

In some embodiments, the at least one time period may be one time period. In some exemplary implementations, the time period may be a time period to which the current time of the terminal device belongs.

In some embodiments, the at least one time period may be multiple time periods. In some exemplary implementations, the multiple time periods described above can be consecutive. In other exemplary embodiments, the above-described multiple time periods may be spaced by a time interval. For example, the time interval between two adjacent time periods may be 10 seconds, 15 seconds, 30 seconds, and the like.

For example, a value of the time interval may be specified in a communication protocol shared by the network device and the terminal device.

Optionally, in the embodiments of the disclosure, the specified area may include any of the following areas: an area of a specified cell and a coverage area of a specified beam. The specified area may be specified by the network device.

The cell configuration parameter may include, but is not limited to, a cell bandwidth, a Cyclic Prefix (CP) type, a number of transmitting antennas, and so on.

When the specified area is an area of a specified cell, all terminal devices located in the area of the specified cell may receive the first system information. When the specified area is a coverage area of a specified beam, all terminal devices located in the coverage area may receive the first system information.

In some embodiments, the first system information may be sent via a broadcast signaling. In other embodiments, the first system information may be sent via a dedicated signaling.

In the embodiments of the disclosure, the neighboring cell information of the terminal device during a corresponding time period is sent to the terminal device, to enable the terminal device to perform measurement based on the neighboring cell information during the corresponding time period, so that the terminal device can be prevented from measuring neighboring cells that do not currently exist, and the resource overhead of the terminal device can be saved.

As illustrated in FIG. 3, FIG. 3 is a flowchart of a method for configuring a neighboring cell provided by an embodiment of the disclosure. The method is performed by a network device in the non-terrestrial communication system shown in FIG. 1. As illustrated in FIG. 3, the method may include, but is not limited to, the following steps.

At step S301, second system information is sent to a terminal device within a specified area, in which the second system information includes a paging time domain resource corresponding to the at least one time period.

Similar to other embodiments of the disclosure, the at least one time period includes one time period or multiple time periods.

In some embodiments, the second system information may be sent via a broadcast signaling. In other embodiments, the second system information may be sent via a dedicated signaling.

In some embodiments, the paging time domain resource described above may include a paging frame and/or a paging occasion.

In a possible implementation, the above paging time domain resource may include a paging frame. Correspondingly, in the case where the terminal device is in a radio resource control (RRC) connected state during a corresponding time period, the terminal device monitors a paging message sent by the network device on a paging frame of the corresponding time period.

In another possible implementation, the above paging time domain resource may include a paging frame and a corresponding paging occasion. Correspondingly, in the case where the terminal device is in an RRC non-connected state during the corresponding time period, the terminal device monitors the paging message sent by the network device on the paging occasion of the corresponding paging frame during the corresponding time period.

In some embodiments, the RRC non-connected state may be an RRC idle state. In other embodiments, the above RRC non-connected state may be an RRC inactive state. That is, the RRC non-connected state may be an RRC sleeping state.

In some possible embodiments, the method further includes the following steps.

At step S302, first system information is sent to the terminal device within the specified area, in which the first system information includes: a list of neighboring cells corresponding to a cell where the terminal device is located for at least one time period, and a cell configuration parameter of each neighboring cell in the list of neighboring cells.

It is noted that steps S301 and S302 may be performed in any order.

In the embodiment of the disclosure, the paging time domain resource corresponding to each of the at least one time period is sent to the terminal device via the second system information, so that the terminal device can know the paging time domain resource by means of the system information. Therefore, the terminal device can monitor the paging message based on the paging time domain resource when the terminal device intends to receive a paging message from the network device, thereby reducing the power consumption of the terminal device.

Further, the list of neighboring cells corresponding to the terminal device for the at least one time period and the cell configuration parameter of each neighboring cell in the list of neighboring cells may be sent to the terminal device via the first system message. Therefore, in combination with the paging time domain resource of the at least one time period, the terminal device can monitor the paging message based on the paging time domain resource when the terminal device intends to receive the paging message from the network device, thereby reducing the power consumption of the terminal device.

Based on the above embodiments, in response to the terminal device being in the RRC non-connected state during a target time period, a paging message for a target cell is sent on a paging time domain resource corresponding to the target time period. The target time period is one of the at least one time period. Therefore, the terminal device can only monitor the paging message on the paging time domain resource when the terminal device intends to receive the paging message from the network device, thereby further reducing the power consumption of the terminal device.

In some embodiments, after sending the first system information to the terminal device within the specified area, in response to the terminal device being in the RRC connected state during the target time period, a target cell to be switched to by the terminal device is determined. The target time period is one of the at least one time period. The target cell is a neighboring cell in a list of neighboring cells corresponding to the target time period.

In some embodiments, a possible implementation of determining the target cell to be switched to by the terminal device may be as follows. Cell information and a channel quality measurement result corresponding to the cell information uploaded during the target time period by the terminal device in the RRC connected state are received, and the target cell to be switched to by the terminal device is determined according to the cell information and the corresponding channel quality measurement result.

As illustrated in FIG. 4, FIG. 4 is a flowchart of a method for configuring a neighboring cell provided by an embodiment of the disclosure. The method is performed by a terminal device within a specified area in the communication system shown in FIG. 1. As illustrated in FIG. 4, the method may include, but is not limited to, the following steps.

At step S401, first system information within the specified area sent by a network device is received, in which the first system information includes: a list of neighboring cells corresponding to a cell where the terminal device is located for at least one time period, and a cell configuration parameter of each neighboring cell in the list of neighboring cells.

Optionally, in the embodiment of the disclosure, the specified area may include any of the following areas: an area of a specified cell and a coverage area of a specified beam. The specified area may be specified by the network device.

In some embodiments, the terminal device receives the first system information within the specified area sent by the network device via a broadcast signaling. In other embodiments, the terminal device receives the first system information within the specified area sent by the network device via a dedicated signaling.

In the embodiment of the disclosure, the first system information sent by the network device is received. The first system information includes neighboring cell information corresponding to the cell where the terminal device is located for the at least one time period, so that the terminal device can know the neighboring cell information by receiving the system information sent by the network device, so as to perform channel quality measurement on each neighboring cell according to the cell configuration parameter and the neighboring cell information during the corresponding time period. Therefore, the terminal device can be prevented from performing channel quality measurement on neighboring cells that do not currently exist, and the resource overhead of the terminal device can be saved.

In some embodiments, the method further includes the following steps.

At step 402, second system information sent by the network device is received, in which the second system information includes a paging time domain resource corresponding to the at least one time period.

In some embodiments, the terminal device may receive the second system information sent by the network device via a broadcast signaling.

In other embodiments, the terminal device may receive the second system information sent by the network device via a dedicated signaling.

It is noted that steps S401 and S402 may be performed in any order.

In some embodiments, the above step 402 may be in a separate embodiment, i.e., the embodiment includes only step 402 and does not include step 401.

In some embodiments, the terminal device may receive the second system information sent by the network device via a broadcast signaling.

In other embodiments, the terminal device may receive the second system information sent by the network device via a dedicated signaling.

In some embodiments, the above paging time domain resource may include a paging frame and/or a paging occasion.

In a possible implementation, the above paging time domain resource may include a paging frame. Correspondingly, in the case where the terminal device is in an RRC connected state during the corresponding time period, the terminal device monitors a paging message sent by the network device on a paging frame of the corresponding time period.

In another possible implementation, the above paging time domain resource may include a paging frame and a paging occasion corresponding to the paging frame. Correspondingly, in the case where the terminal device is in an RRC non-connected state during the corresponding time period, the terminal device monitors the paging message sent by the network device on the paging occasion of the corresponding paging frame during the corresponding time period.

In some embodiments, the RRC non-connected state may be an RRC idle state. In other embodiments, the RRC non-connected state may be a RRC inactive state. That is, the above RRC non-connected state may be an RRC sleeping state.

In the embodiment, the terminal device receives the second system information, so as to learn the paging time domain resource via the system information, so that when the terminal device intends to receive the paging message from the network device, the terminal device can monitor the paging message based on the paging time domain resource, thereby reducing the power consumption of the terminal device.

As illustrated in FIG. 5, FIG. 5 is a flowchart of a method for configuring a neighboring cell provided by an embodiment of the disclosure. The method is performed by a terminal device within a specified area in the communication system shown in FIG. 1. As illustrated in FIG. 5, the method may include, but is not limited to, the following steps.

At step S501, first system information within the specified area sent by a network device is received, in which the first system information includes: at least one list of neighboring cells corresponding to a cell where the terminal device is located for at least one time period, and a cell configuration parameter of each neighboring cell in the at least one list of neighboring cells.

Optionally, in the embodiment of the disclosure, the specified area may include any of the following areas: an area of a specified cell and a coverage area of a specified beam. The specified area may be specified by the network device.

In some embodiments, the terminal device receives the first system information within the specified area sent by the network device via a broadcast signaling. In other embodiments, the terminal device receives the first system information within the specified area sent by the network device via a dedicated signaling.

In some embodiments, the at least one time period may be one time period. In some exemplary implementations, the above time period may be a time period to which the current time of the terminal device belongs.

In some embodiments, the at least one time period may be multiple time periods. In some exemplary implementations, the multiple time periods described above can be consecutive. In other exemplary embodiments, the above-described multiple time periods may be spaced by a time interval. For example, the time interval between two adjacent time periods may be 10 seconds, 15 seconds, 30 seconds, and the like. For example, a value of the time interval may be specified in a communication protocol shared by the network device and the terminal device.

At step S502, a target time period to which current time of the terminal device belongs is determined according to the current time, in which the target time period is one of the at least one time period.

In some embodiments, the current time of the terminal device may be obtained, and the current time may be compared with the at least one time period in the first system information, to determine the target time period to which the current time of the terminal device belongs. The target time period is one of the at least one time period.

At step S503, a target list of neighboring cells corresponding to the target time period is determined according to the at least one list of neighboring cells corresponding to the at least one time period.

At step S504, in response to the terminal device being in an RRC non-connected state during the target time period, a channel quality of each neighboring cell is measured according to a cell configuration parameter of each neighboring cell in the target list of neighboring cells, and cell reselection is performed according to a channel quality measurement result of each neighboring cell.

In some embodiments, the RRC non-connected state may be an RRC idle state. In other embodiments, the above RRC non-connected state may be a RRC inactive state. That is, the RRC non-connected state may be a RRC sleeping state.

In some embodiments, the above channel quality measurement result may include at least one of the following data: a Reference Signal Receiving Power (RSRP), a Reference Signal Receiving Quality (RSRQ), and a Signal to Interference plus Noise Ratio (SINR).

The above performing cell reselection based on the channel quality measurement result of each neighboring cell may be realized by the related art, which is not limited in the embodiment of the disclosure.

In the embodiment of the disclosure, by receiving the first system information within the specified area sent by the network device, the terminal device can determine the target time period to which the current time belongs. In response to the terminal device being in the RRC non-connected state during the target time period, the terminal device measures the channel quality of each neighboring cell according to the cell configuration parameter of each neighboring cell in the target list of neighboring cells. Moreover, the terminal device also performs cell reselection according to the channel quality measurement result of each neighboring cell. Therefore, when in the specified area, the terminal device may perform measurement based on the neighboring cell information corresponding to the time period to which the terminal device currently belongs in combination with the corresponding cell configuration parameter, so that the terminal device can be prevented from measuring the neighboring cells that do not currently exist, and the power consumption of the terminal device can be reduced.

As illustrated in FIG. 6, FIG. 6 is a flowchart of a method for configuring a neighboring cell provided by an embodiment of the disclosure. The method is performed by a terminal device within a specified area in the communication system shown in FIG. 1. As illustrated in FIG. 6, the method may include, but is not limited to, the following steps.

At step S601, a target cell reselected by cell reselection is obtained.

It is understood that the target cell may be obtained in the manner shown in FIG. 5, which is not further limited in this embodiment.

At step S602, a target paging time domain resource corresponding to the target time period is determined according to at least one paging time domain resource corresponding to the at least one time period.

In some embodiments, the at least one paging time domain resource corresponding to the at least one time period can be determined in a variety of ways. The at least one paging time domain resource corresponding to the at least one time period can be determined from a communication protocol on which the terminal device is based in combination with the specified area.

In other embodiments, second system information sent by the network device may be received. The second system information includes: the at least one paging time domain resource corresponding to the at least one time period.

In some embodiments, the terminal device may receive the second system information sent by the network device via a broadcast signaling.

In other embodiments, the terminal device may receive the second system information sent by the network device via a dedicated signaling.

At step S603, a paging message for the target cell is monitored on the target paging time domain resource.

In some embodiments, the above paging time domain resource may include a paging frame and/or a paging occasion.

In a possible implementation, the above paging time domain resource may include a paging frame. Correspondingly, in the case where the terminal device is in an RRC connected state during a corresponding time period, the terminal device monitors the paging message sent by the network device on the paging frame of a corresponding time period.

In other embodiments, the above paging time domain resource may include a paging frame and a paging occasion corresponding to the paging frame. Correspondingly, in the case where the terminal device is in an RRC non-connected state during the corresponding time period, the terminal device monitors the paging message sent by the network device on the paging occasion of the corresponding paging frame during the corresponding time period.

In the embodiment of the disclosure, when the terminal device is in the RRC non-connected state during the target time period, the terminal device determines the target paging time domain resource corresponding to the target time period, and monitors the paging message for the target cell on the target paging time domain resource. Therefore, the terminal device is prevented from continuously monitoring the paging message during the target time period, and the power consumption of the terminal device is further reduced.

As illustrated in FIG. 7, FIG. 7 is a flowchart of a method for configuring a neighboring cell provided by an embodiment of the disclosure. The method is performed by a terminal device within a specified area in the communication system shown in FIG. 1. As illustrated in FIG. 7, the method may include, but is not limited to, the following steps.

At step S701, first system information within the specified area sent by a network device is received, in which the first system information includes: at least one list of neighboring cells corresponding to a cell where the terminal device is located for at least one time period, and a cell configuration parameter of each neighboring cell in the at least one list of neighboring cells.

Optionally, in the embodiment of the disclosure, the specified area may include any of the following areas: an area of a specified cell and a coverage area of a specified beam. The specified area may be specified by the network device.

In some embodiments, the terminal device receives the first system information within the specified area sent by the network device via a broadcast signaling. In other embodiments, the terminal device receives the first system information within the specified area sent by the network device via a dedicated signaling.

In some embodiments, the at least one time period may be one time period. In some exemplary implementations, the above time period may be a time period to which current time of the terminal device belongs.

In other embodiments, the at least one time period may be multiple time periods. In some exemplary implementations, the multiple time periods described above can be consecutive. In other exemplary embodiments, the above-described multiple time periods may be spaced by a time interval. For example, the time interval between two adjacent time periods may be 10 seconds, 15 seconds, 30 seconds, and the like. For example, a value of the time interval may be specified in a communication protocol shared by the network device and the terminal device.

At step S702, a target time period to which current time of the terminal device belongs is determined according to the current time, in which the target time period is one of the at least one time period.

In some embodiments, the current time of the terminal device may be obtained, and the current time may be compared with the at least one time period in the first system information, to determine the target time period to which the current time of the terminal device belongs. The target time period is one of the at least one time period.

At step S703, a target list of neighboring cells corresponding to the target time period is determined according to the at least one list of neighboring cells corresponding to the at least one time period.

At step S704, in response to the terminal device being in an RRC connected state, a channel quality of each neighboring cell is measured according to a cell configuration parameter of each neighboring cell in the target list of neighboring cells, and handover is performed according to a channel quality measurement result of each neighboring cell.

In some embodiments, the above channel quality measurement result may include at least one of: a RSRP, a RSRQ, and a SINR.

It is noted that performing the above handover based on the channel quality measurement result of each neighboring cell may be realized by the related art, which is not limited in the embodiment of the disclosure.

In the embodiment of the disclosure, by receiving the first system information within the specified area sent by the network device, the terminal device can determine the target time period to which the current time belongs. In response to the terminal device being in the RRC connected state during the target time period, the terminal device measures the channel quality of each neighboring cell according to the cell configuration parameter of each neighboring cell in the list of neighboring cells corresponding to the target time period. Moreover, the terminal device also performs handover according to the channel quality measurement result of each neighboring cell. Therefore, when in the specified area, the terminal device may perform measurement according to the neighboring cell information corresponding to the time period to which the terminal device currently belongs in combination with the corresponding cell configuration parameter, so that the terminal device can be prevented from measuring the neighboring cells that do not currently exist, and the power consumption of the terminal device can be reduced.

Based on the embodiment shown in FIG. 7, in order to enable the network device to prepare for handover, in some embodiments, for each neighboring cell, in response to the channel quality measurement result of the neighboring cell satisfying the reporting condition, the channel quality measurement result of the neighboring cell is sent to the network device, so that the network device can obtain the neighboring cell information corresponding to the cell where the terminal device is located and the channel quality measurement result of the neighboring cell, and then determine the target cell to which the terminal device intends to switch based on the channel quality measurement result of the neighboring cell.

In some embodiments, the above reporting condition may be that the channel quality measurement result exceeds its corresponding preset threshold.

In some embodiments, the preset threshold corresponding to the above channel quality measurement result may be configured by the network device, or may be determined by the terminal device based on a communication protocol, which is not limited in this embodiment.

In some embodiments, the above channel quality measurement result may include at least one of the following data: a RSRP, a RSRQ, and a SINR.

It should be noted that the above RSRP, RSRQ and SINR have their corresponding preset thresholds respectively. That is, the preset thresholds corresponding to the above three types of data may be different.

In the above embodiments provided by the disclosure, the methods provided by the embodiments of the disclosure are introduced from the perspectives of the network device and the terminal device respectively. In order to realize each of the functions in the methods according to the above embodiments of the disclosure, the network device and the terminal device may include a hardware structure, a software module, and realize each of the above functions in the form of hardware structure, software module, or a combination of hardware structure and software module. A certain function of the above functions may be performed in the form of hardware structure, software module, or a combination of hardware structure and software module.

As illustrated in FIG. 8, FIG. 8 is a block diagram of an apparatus 80 for configuring a neighboring cell provided by an embodiment of the disclosure. The apparatus 80 shown in FIG. 8 may include a transceiver unit 801 and a processing unit 802. The transceiver unit 801 may include a sending unit and/or a receiving unit. The sending unit is used to implement a sending function, and the receiving unit is used to implement a receiving function. The transceiver unit 801 may implement the sending function and/or the receiving function.

The apparatus 80 may be a network device, a device in the network device, or a device that can be used in combination with the network device. Alternatively, the apparatus 80 may be a terminal device, a device in the terminal device, or a device that can be used in combination with the terminal device.

The apparatus 80 is a network device. The transceiver unit 801 is configured to send first system information to a terminal device within a specified area, in which the first system information includes: a list of neighboring cells corresponding to a cell where the terminal device is located for at least one time period, and a cell configuration parameter of each neighboring cell in the list of neighboring cells.

In a possible implementation, the transceiver unit 801 is further configured to: send second system information to the terminal device within the specified area, in which the second system information includes a paging time domain resource corresponding to the at least one time period.

In a possible implementation, the processing unit 802 is configured to: in response to the terminal device being in an RRC non-connected state during a target time period, send a paging message for a target cell on a paging time domain resource corresponding to the target time period, in which the target time period is one of the at least one time period.

In a possible implementation, the processing unit 802 is configured to: in response to the terminal device being in an RRC connected state during a target time period, determine a target cell to be switched to by the terminal device.

Optionally, the paging time domain resource includes a paging frame, or the paging time domain resource includes a paging frame and a paging occasion corresponding to the paging frame.

In a possible implementation, when there are multiple time periods, the multiple time periods are consecutive, or, the multiple time periods are spaced by a time interval.

The apparatus 80 is a terminal device. The transceiver unit 801 is configured to receive first system information within the specified area sent by a network device, in which the first system information includes: at least one list of neighboring cells corresponding to a cell where the terminal device is located for at least one time period, and a cell configuration parameter of each neighboring cell in the at least one list of neighboring cells.

In a possible implementation, the processing unit 802 is configured to: determine a target time period to which current time of the terminal device of the terminal device belongs according to the current time, in which the target time period is one of the at least one time period; determine a target list of neighboring cells corresponding to the target time period according to the at least one list of neighboring cells corresponding to the at least one time period; and in response to the terminal device being in an RRC non-connected state during the target time period, measure a channel quality of each neighboring cell according to cell configuration parameter of each neighboring cell in the target list of neighboring cells, and perform cell reselection according to a channel quality measurement result of each neighboring cell.

In a possible implementation, the processing unit 802 is configured to: determine a target time period to which current time of the terminal device belongs according to the current time, in which the target time period is one of the at least one time period; determine a target list of neighboring cells corresponding to the target time period according to the at least one list of neighboring cells corresponding to the at least one time period; and in response to the terminal device being in an RRC connected state, measure a channel quality of each neighboring cell according to a cell configuration parameter of each neighboring cell in the target list of neighboring cells, and perform handover according to a channel quality measurement result of each neighboring cell.

Optionally, the processing unit 802 is further configured to: obtain a target cell reselected by cell reselection; determine a target paging time domain resource corresponding to the target time period according to at least one paging time domain resource corresponding to the at least one time period; and monitor a paging message for the target cell on the target paging time domain resource.

In a possible implementation, the transceiver unit 801 is further configured to: receive second system information sent by the network device, in which the second system information comprises the at least one paging time domain resource corresponding to the at least one time period.

In a possible implementation, the paging time domain resource includes a paging frame, or the paging time domain resource includes a paging frame and a paging occasion corresponding to the paging frame.

Optionally, the transceiver unit 801 is further configured to: for each neighboring cell, in response to the channel quality measurement result of the neighboring cell satisfying a reporting condition, send the channel quality measurement result of the neighboring cell to the network device.

Figure 9:
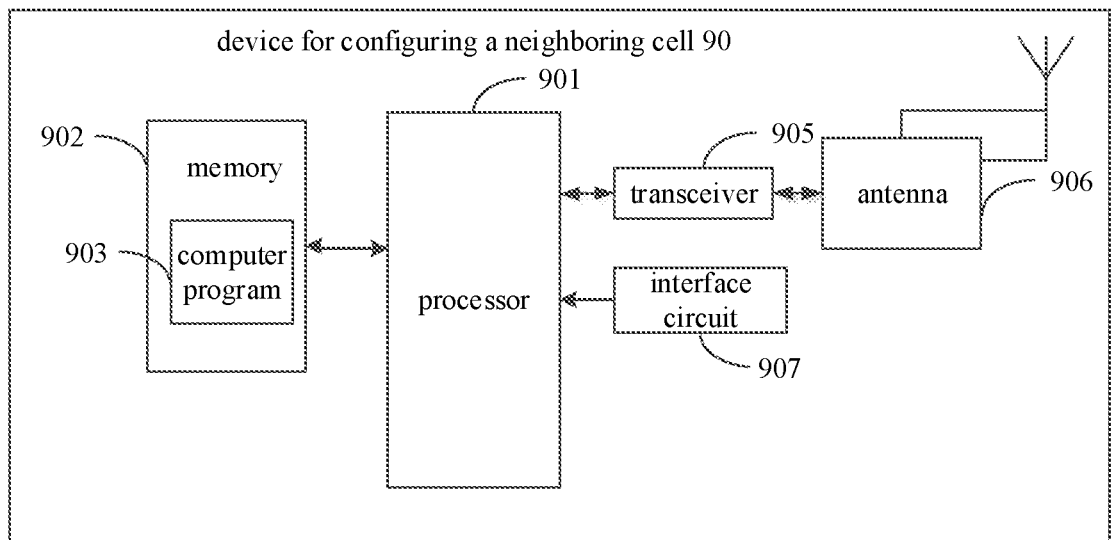
FIG. 9 is a block diagram of a device for configuring a neighboring cell provided by an embodiment of the disclosure.

As illustrated in FIG. 9, FIG. 9 is a block diagram of a device for configuring a neighboring cell provided by an embodiment of the disclosure. The device 90 may be a network device, a terminal device, a chip, a chip system or a processor that supports the network device to realize the above-described methods, or a chip, a chip system or a processor that supports the terminal device to realize the above-described methods. The device may be used to realize the methods described in the above method embodiments with reference to the descriptions of the above-described method embodiments.

The device 90 may include one or more processors 901. The processor 901 may be a general purpose processor or a dedicated processor, such as, a baseband processor or a central processor. The baseband processor is used for processing communication protocols and communication data. The central processor is used for controlling the devices (e.g., a base station, a baseband chip, a terminal device, a terminal device chip, a central unit (CU) or a distributed unit (DU)), executing computer programs, and processing data of the computer programs.

Optionally, the device 90 may include one or more memories 902 on which computer programs 903 may be stored. The processor 901 executes the computer programs 903 to cause the device 90 to perform the methods described in the above method embodiments. The computer program 903 may be solidified in the processor 901, in which case the processor 901 may be implemented by hardware.

Optionally, data may also be stored in the memory 902. The device 90 and the memory 902 may be provided separately or may be integrated together.

Optionally, the device 90 may also include a transceiver 905 and an antenna 906. The transceiver 905 may be referred to as a transceiver unit, a transceiver machine, or a transceiver circuit, for realizing a transceiver function. The transceiver 905 may include a receiver and a transmitter. The receiver may be referred to as a receiver machine or a receiving circuit, for realizing a receiving function. The transmitter may be referred to as a transmitter machine or a transmitting circuit, for realizing a transmitting function.

Optionally, the device 90 may also include one or more interface circuits 907. The interface circuits 907 are used to receive code instructions and transmit the code instructions to the processor 901. The processor 901 runs the code instructions to cause the device 90 to perform the method described in the method embodiments.

The device 90 is a network device. The transceiver 905 is used to perform step S201 in FIG. 2, and steps S301 and S302 in FIG. 3.

The device 90 is a terminal device. The transceiver 905 is used to perform steps S401 and S402 in FIG. 4, step S501 in FIG. 5, and step S701 in FIG. 7. The processor 901 is configured to perform steps S502-S504 in FIG. 5, steps S601-S603 in FIG. 6, and steps S702-S704 in FIG. 7.

In an implementation, the processor 901 may include a transceiver for implementing the receiving and transmitting functions. The transceiver may be, for example, a transceiver circuit, an interface, or an interface circuit. The transceiver circuit, interface, or interface circuit for implementing the receiving and transmitting functions may be separated or may be integrated together. The transceiver circuit, interface, or interface circuit described above may be used for code/data reading and writing, or may be used for signal transmission or delivery.

In an implementation, the device 90 may include circuits. The circuits may implement the sending, receiving or communicating function in the above method embodiments. The processors and transceivers described in this disclosure may be implemented on integrated circuits (ICs), analog ICs, radio frequency integrated circuits (RFICs), mixed signal ICs, application specific integrated circuits (ASICs), printed circuit boards (PCBs), and electronic devices. The processors and transceivers can also be produced using various IC process technologies such as complementary metal oxide semiconductor (CMOS), nMetal-oxide-semiconductor (NMOS), positive channel metal oxide semiconductor (PMOS), bipolar junction transistor (BJT), bipolar CMOS (BiCMOS), silicon-germanium (SiGe), gallium arsenide (GaAs) and so on.

The device in the above description of embodiments may be a network device or a terminal device, but the scope of the device described in the disclosure is not limited thereto, and the structure of the device may not be limited by FIG. 9. The device may be a stand-alone device or may be part of a larger device. For example the device may be:

(1) a stand-alone IC, chip, chip system or subsystem;

(2) a collection of ICs including one or more ICs, optionally, the collection of ICs may also include storage components for storing data and computer programs;

(3) an ASIC, such as a modem;

(4) modules that can be embedded within other devices;

(5) receivers, terminal devices, smart terminal devices, cellular phones, wireless devices, handheld machines, mobile units, in-vehicle devices, network devices, cloud devices, artificial intelligence devices, and the like; and (6) others.

Figure 10:
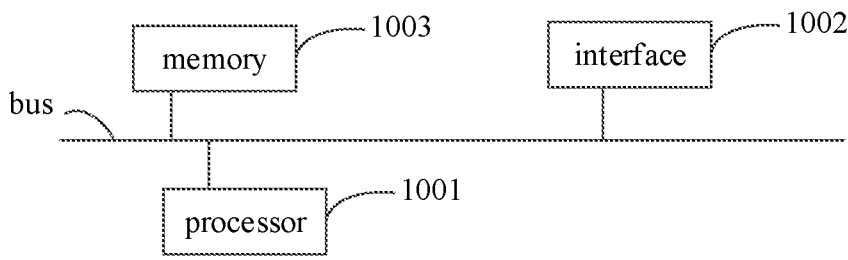
FIG. 10 is a block diagram of a chip provided by an embodiment of the disclosure.

The case where the device may be a chip or a chip system is described with reference to the schematic structure of the chip shown in FIG. 10. The chip shown in FIG. 10 includes a processor 1001 and an interface 1002. There may be one or more processors 1001, and there may be multiple interfaces 1002.

In cases where the chip is used to implement the function of the network device in the embodiment of the disclosure, the interface 1002 is used for receiving code instructions and transmitting the code instructions to a processor; and the processor 1001 is used for running the code instructions to perform the method as shown in FIGS. 2 to 3.

In cases where the chip is used to implement the function of the terminal device in the embodiment of the disclosure, the interface 1002 is used for receiving code instructions and transmitting the code instructions to a processor; and the processor 1001 is used for running the code instructions to perform the method as in FIGS. 4 to 7.

Optionally, the chip further includes a memory 1003 used to store necessary computer programs and data.

It is understandable by those skilled in the art that various illustrative logical blocks and steps listed in the embodiments of the disclosure may be implemented by electronic hardware, computer software, or a combination thereof. Whether such function is implemented by hardware or software depends on the particular application and the design requirements of the entire system. Those skilled in the art may, for each particular application, use various methods to implement the described function, but such implementation should not be construed as being beyond the scope of protection of the embodiments of the disclosure.

The embodiments of the disclosure also provide a communication system. The system includes an apparatus acting as a terminal device and an apparatus acting as a network device in the embodiment of FIG. 8. Or, it includes an apparatus acting as a terminal device and an apparatus acting as a network device in the aforementioned embodiment of FIG. 9.

The disclosure also provides a readable storage medium having instructions stored thereon. When the instructions are executed by a computer, the function of any of the method embodiments described above is implemented.

The disclosure also provides a computer program product. When the computer program product is executed by a computer, the function of any of the method embodiments described above is implemented.

The above embodiments may be implemented in whole or in part by software, hardware, firmware, or any combination thereof. When implemented using software, it may be implemented, in whole or in part, in the form of a computer program product. The computer program product includes one or more computer programs. When loading and executing the computer program on the computer, all or part of processes or functions described in the embodiments of the disclosure is implemented. The computer may be a general-purpose computer, a dedicated computer, a computer network, or other programmable devices. The computer program may be stored in a computer-readable storage medium or transmitted from one computer-readable storage medium to another computer-readable storage medium. For example, the computer program may be transmitted from one web site, computer, server, or data center to another web site, computer, server, or data center, in a wired manner (e.g., by using coaxial cables, fiber optics, or digital subscriber lines (DSLs) or wirelessly (e.g., by using infrared wave, wireless wave, or microwave). The computer-readable storage medium may be any usable medium to which the computer is able to access to or a data storage device such as a server and a data center integrated by one or more usable mediums. The usable medium may be a magnetic medium (e.g., floppy disk, hard disk, and tape), an optical medium (e.g., a high-density digital video disc (DVD)), or a semiconductor medium (e.g., a solid state disk (SSD)).

Those skilled in the art understands that the first, second, and other various numerical numbers involved in the disclosure are only described for the convenience of differentiation, and are not used to limit the scope of the embodiments of the disclosure or indicate the order of precedence.

The term "at least one" in the disclosure may also be described as one or more, and the term "multiple" may be two, three, four, or more, which is not limited in the disclosure. In the embodiments of the disclosure, for one type of technical features, "first", "second", and "third", and "A", "B", "C" and "D" are used to distinguish different technical features of this type, the technical features described using the "first", "second", and "third", and "A", "B", "C" and "D" do not indicate any order of precedence or magnitude.

The correspondences shown in the tables in this disclosure may be configured or may be predefined. The values of information in the tables are merely examples and may be configured to other values, which are not limited by the disclosure. In configuring the correspondence between the information and the parameters, it is not necessarily required that all the correspondences illustrated in the tables must be configured. For example, some of the correspondence shown in the tables in the disclosure may also be left un-configured. For example, the above tables may be adjusted appropriately, such as splitting, merging, and the like. The names of the parameters shown in the headings of the above tables may be other names that are understandable by the communication device, and the values or representations of the parameters may be other values or representations that are understandable by the communication device. Each of the above tables may also be implemented with other data structures, such as, arrays, queues, containers, stacks, linear tables, pointers, chained lists, trees, graphs, structures, classes, heaps, and hash tables.

The term "predefine" in this disclosure may be understood as define, pre-define, store, pre-store, pre-negotiate, pre-configure, solidify, or pre-fire.

Those skilled in the art may realize that the units and algorithmic steps of the various examples described in combination with the embodiments disclosed herein are capable of being implemented in the form of electronic hardware, or a combination of computer software and electronic hardware. Whether these functions are performed in hardware or software depends on the particular application and design constraints of the technical solution. Those skilled in the art may use different methods to implement the described functions for each particular application, but such implementations should not be considered as beyond the scope of the disclosure.

It is clearly understood by those skilled in the art that, for the convenience and brevity of description, the specific working processes of the systems, apparatuses, and units described above can be referred to the corresponding processes in the above method embodiments, and will not be repeated herein.

The above implementations are only specific implementations of the disclosure, but the scope of protection of the disclosure is not limited thereto. Those skilled in the art familiar to this technical field can easily think of changes or substitutions in the technical scope disclosed by the disclosure, which shall be covered by the scope of protection of the disclosure. Therefore, the scope of protection of the disclosure shall be governed by the scope of protection of the appended claims.

What is claimed is:

1. A method for configuring a neighboring cell, executed by a network device, comprising:

sending first system information to a terminal device within a specified area, wherein the first system information comprises: a list of neighboring cells corresponding to a cell where the terminal device is located for at least one time period, and a cell configuration parameter of each neighboring cell in the list of neighboring cells; and sending second system information to the terminal device within the specified area, wherein the second system information comprises a paging time domain resource corresponding to the at least one time period;

wherein the paging time domain resource corresponding to the at least one time period is configured for the terminal device for determining a target paging time domain resource corresponding to a target time period and monitoring a paging message for the target cell on the target paging time domain resource.

2. The method of claim 1, further comprising:

determining that the terminal device is in a radio resource control (RRC) non-connected state during a target time period, and sending a paging message for a target cell on a paging time domain resource corresponding to the target time period, wherein the target time period is one of the at least one time period.

3. The method of claim 1, further comprising:

determining that the terminal device is in an RRC connected state during a target time period, and determining a target cell to be switched to by the terminal device, wherein the target time period is one of the at least one time period, and the target cell is a neighboring cell in a list of neighboring cells corresponding to the target time period.

4. The method of claim 1, wherein the paging time domain resource comprises at least one of: a paging frame, or a paging occasion.

5. A method for configuring a neighboring cell, executed by a terminal device, comprising:

receiving first system information within a specified area sent by a network device, wherein the first system information comprises: at least one list of neighboring cells corresponding to a cell where the terminal device is located for at least one time period, and a cell configuration parameter of each neighboring cell in the at least one list of neighboring cells;

receiving second system information to the terminal device within the specified area, wherein the second system information comprises at least one paging time domain resource corresponding to the at least one time period;

determining a target paging time domain resource corresponding to a target time period according to the at least one paging time domain resource corresponding to the at least one time period; and monitoring a paging message for the target cell on the target paging time domain resource.

6. The method of claim 5, further comprising:

determining a target time period to which current time of the terminal device belongs according to the current time, wherein the target time period is one of the at least one time period;

determining a target list of neighboring cells corresponding to the target time period according to the at least one list of neighboring cells corresponding to the at least one time period; and determining that the terminal device is in an RRC non-connected state during the target time period, measuring a channel quality of each neighboring cell according to a cell configuration parameter of each neighboring cell in the target list of neighboring cells, and performing cell reselection according to a channel quality measurement result of each neighboring cell.

7. The method of claim 6, wherein before determining a target paging time domain resource corresponding to the target time period according to at least one paging time domain resource corresponding to the at least one time period, the terminal device further performs:

obtaining a target cell reselected by cell reselection.

8. The method of claim 5, further comprising:

determining a target time period to which current time of the terminal device belongs according to the current time, wherein the target time period is one of the at least one time period, wherein the target time period is one of the at least one time period;

determining a target list of neighboring cells corresponding to the target time period according to the at least one list of neighboring cells corresponding to the at least one time period; and determining that the terminal device is in an RRC connected state, measuring a channel quality of each neighboring cell according to a cell configuration parameter of each neighboring cell in the target list of neighboring cells, and performing handover according to a channel quality measurement result of each neighboring cell.

9. The method of claim 8, further comprising:

for each neighboring cell, determining that the channel quality measurement result of the neighboring cell satisfies a reporting condition, and sending the channel quality measurement result of the neighboring cell to the network device.

10. The method of claim 5, wherein the paging time domain resource comprises at least one of: a paging frame, or a paging occasion.

11. A device for configuring a neighboring cell, comprising a processor and a memory having computer programs stored thereon, wherein when the computer programs are executed by the processor, the processor is configured to perform the method of claim 5.

12. A device for configuring a neighboring cell, comprising a processor and a memory having computer programs stored thereon, wherein when the computer programs are executed by the processor, the processor is configured to:

send first system information to a terminal device within a specified area, wherein the first system information comprises: a list of neighboring cells corresponding to a cell where the terminal device is located for at least one time period, and a cell configuration parameter of each neighboring cell in the list of neighboring cells; and send second system information to the terminal device within the specified area, wherein the second system information comprises a paging time domain resource corresponding to the at least one time period;

wherein the paging time domain resource corresponding to the at least one time period is configured for the terminal device for determining a target paging time domain resource corresponding to a target time period and monitoring a paging message for the target cell on the target paging time domain resource.

13. The device of claim 12, wherein the processor is configured to:

determine that the terminal device is in a radio resource control (RRC) non-connected state during a target time period, and send a paging message for a target cell on a paging time domain resource corresponding to the target time period, wherein the target time period is one of the at least one time period.

14. The device of claim 12, wherein the processor is configured to:

determine that the terminal device is in an RRC connected state during a target time period, and determine a target cell to be switched to by the terminal device, wherein the target time period is one of the at least one time period, and the target cell is a neighboring cell in a list of neighboring cells corresponding to the target time period.

15. The device of claim 12, wherein the paging time domain resource comprises at least one of: a paging frame, or a paging occasion.

* * * * *